United States Patent [19]

Blocquel

[11] Patent Number: 4,756,867
[45] Date of Patent: Jul. 12, 1988

[54] DEVICE FOR THE REMOTE MEASUREMENT OF THE OUTSIDE DIAMETER OF A CYLINDRICAL ELEMENT PROJECTING RELATIVE TO THE SURFACE OF A PLATE

[75] Inventor: Alain Blocquel, Dardilly, France

[73] Assignee: Framatome, Courbevoie, Japan

[21] Appl. No.: 32,690

[22] Filed: Apr. 1, 1987

[30] Foreign Application Priority Data

Apr. 7, 1986 [FR] France ................ 86 04935

[51] Int. Cl.[4] .......................................... G21C 17/00
[52] U.S. Cl. .................................. 376/248; 376/245; 376/259; 33/178 E; 33/178 R; 33/502
[58] Field of Search ............... 376/245, 258, 260, 261, 376/248, 249, 259; 33/502, 178 R, 178 E, 147 R, 147 N; 324/207, 208; 340/870.36

[56] References Cited

U.S. PATENT DOCUMENTS

| | | | |
|---|---|---|---|
| 3,751,812 | 8/1973 | Meyer | 33/178 R |
| 4,126,940 | 11/1978 | Lendi et al. | 33/178 R |
| 4,197,652 | 4/1980 | Qurnell et al. | 376/245 |
| 4,536,960 | 8/1985 | Muti | 33/178 R |
| 4,543,725 | 10/1985 | Golinelli et al. | 33/178 E |
| 4,675,603 | 6/1987 | Rajakovics | 324/208 |
| 4,694,585 | 9/1987 | Frizot et l. | 376/245 |

FOREIGN PATENT DOCUMENTS

| | | | |
|---|---|---|---|
| 0146804 | 7/1985 | European Pat. Off. | 376/245 |
| 1085081 | 1/1955 | France . | |
| 2354536 | 1/1978 | France | 33/178 R |
| 2548348 | 1/1985 | France . | |

OTHER PUBLICATIONS

Journal of Nuclear Materials, vol. 65, No. 1, 1977, pp. 307–312, Masson, "In-pile creep measuring rigs for metallic specimens".

Primary Examiner—Charles T. Jordan
Assistant Examiner—Daniel Wasil
Attorney, Agent, or Firm—Pollock, Vande Sande & Priddy

[57] ABSTRACT

The remote measurement device comprises a supporting structure (5) consisting of a plane annular base connected to the end of a handling pole of great length, and a movable measuring assembly carried by the base (5) and consisting of a stage (30) movable in all directions of the plane of the base coming to rest on the plate (3). The stage (30) is integral with a tubular sleeve (36) the axis of which is perpendicular to the plane of the stage (30), and the supporting structure (5) has a thrust assembly (18) abutting against the outer surface of the sleeve (36). A tracer (38) with a movable rod is mounted on the sleeve (36), with its rod (40) in a radial direction and pointed towards the interior of the sleeve (36). For measurement, the sleeve (36) is slipped onto the cylindrical element (4), and the thrust assembly (18) moves the sleeve (36) and the stage (30) forming the movable measuring assembly as a result of a radial thrust exerted on the sleeve (36) in a zone diametrically opposite the tracer (38). The position or movements of the rod (40) of the tracer (38) are measured.

10 Claims, 2 Drawing Sheets

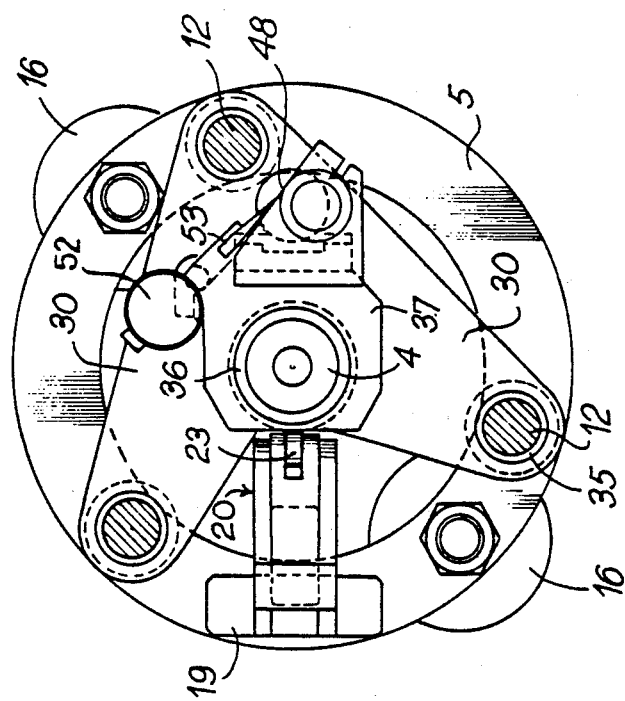
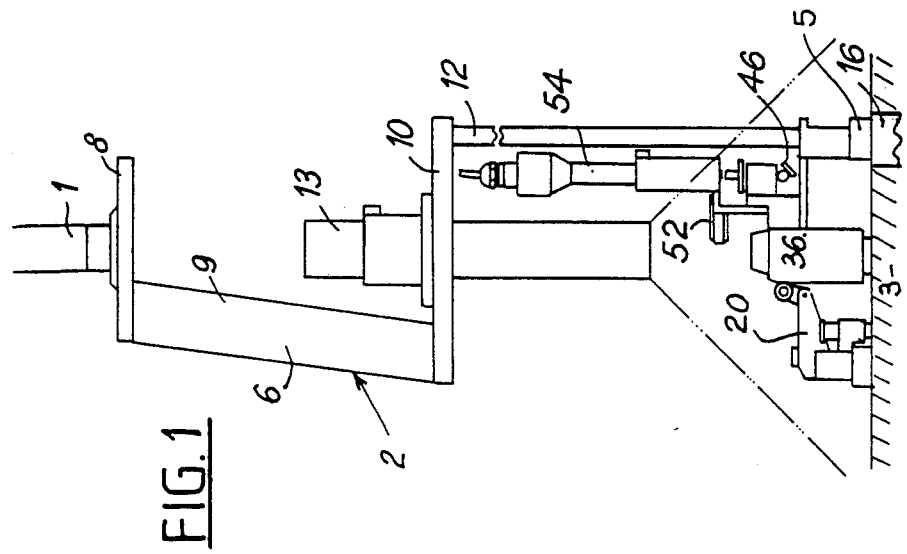

DEVICE FOR THE REMOTE MEASUREMENT OF THE OUTSIDE DIAMETER OF A CYLINDRICAL ELEMENT PROJECTING RELATIVE TO THE SURFACE OF A PLATE

FIELD OF THE INVENTION

The invention relates to a device for the remote measurement of the outside diameter of a cylindrical element projecting relative to the surface of a plate perforated with at least two orifices in the vicinity of the cylindrical element.

BACKGROUND OF THE INVENTION

In pressurized-water nuclear reactors, the lower core plate supporting the fuel assemblies has, in line with each of the assemblies, water passage orifices passing through it over its entire thickness and an instrumentation guide bush projecting relative to the face of the lower core plate, on which the assemblies come to rest. This guide bush is arranged in such a way that its axis coincides with the axis of the instrumentation tube of the corresponding assembly. The instrumentation guide tube is located in the central part of the assembly and receives the glove finger, within which a teleflex cable carrying a neutron-flux sensor at its end is moved along, in order to carry out flux measurements over the entire height of the assembly while the reactor is in operation. Such measurements can thus be made over the entire height of the core in the region of each of the assemblies The guide bush projecting relative to the lower core plate forms the end of a guide duct, in which the glove finger can be moved along in either direction to introduce it into the fuel assembly or, conversely, to extract it, for example at the time when the core is being reloaded.

Each guide bush is located, relative to the corresponding assembly, inside the lower end piece, via which the assembly rests on the lower core plate. The guide bush is completely free inside the lower end piece of the assembly, its axis being aligned with that of the assembly solely as a result of the relative positioning of the bush and the assembly on the lower core plate. In pressurized-water nuclear reactors operating at the present time, the guide bushes of the glove fingers, which are fastened to the lower core plate, consequently do not have an accurately defined outside diameter, since this dimension is not critical to ensure that the guide duct is aligned with the guide tube of the assembly.

To make it easier to install the fuel assemblies and allow differential expansion, the upper end of the guide bush is located at a relatively long distance from the entrance of the guide tube of the assembly, within the lower end piece. Consequently, the glove finger, when introduced into the assembly, is exposed, in the free space existing between the guide bush and the end piece, to cross-currents of cooling water which can make it vibrate.

To overcome this disadvantage, it has been proposed, for example, to provide a matching guide unit which caps the guide bush and which bears on the part of the end piece into which the guide tube of the assembly opens.

The fitting of such a matching guide and protective device presents certain difficulties which arise because the guide bushes in the nuclear reactors operating at the present time do not have a perfectly defined and absolutely constant outside diameter. On the other hand, it is difficult to carry out accurate measurements on highly irradiated equipment which has to be placed under a head of water exceeding ten meters during reactor shutdown and maintenance phases.

Finally, the large number of guide bushes arranged on a lower core plate of a nuclear reactor, corresponding to a number of fuel assemblies in excess of one hundred, makes it necessary to use a measuring process and device which can be installed and put into operation quickly and reliably at a distance.

A device making it possible to carry out such remote measurements of outside diameters repetitively has not been known to date.

However, there are various known devices which are used for conducting tests or dimensional checks on nuclear reactor elements, these devices comprising a pole of great length which can be manipulated from a location above the reactor pool; however, such devices have never been designed to carry out accurate diameter measurements.

SUMMARY OF THE INVENTION

The object of the invention is, therefore, to provide a device for the remote measurement of the outside diameter of a cylindrical element projecting relative to the surface of a plate perforated with at least two orifices in the vicinity of the cylindrical element, and such a device comprises a handling pole of great length and a measuring apparatus connected to the end of the pole and is intended to make it possible to carry out repetitive measurements quickly and very accurately, particularly on elements such as guide bushes fastened to the upper face of the lower core plate of a pressurized-water nuclear reactor.

To achieve this object, the measuring apparatus comprises:

(a) a supporting structure consisting of a plane annular base provided with at least two projecting guide and centering parts intended to interact with the orifices in the plate and a thrust assembly consisting of an arm mounted in an articulated manner on the base and having a bearing means at its end, and of a finger actuating the arm and mounted so as to project relative to a face of the base intended to come into contact with the plate, in order to actuate the thrust arm when they come into contact, and (b) a measuring assembly carried by the supporting structure and consisting of a stage mounted on the annular base so as to be movable in all directions of the plane of the base and with limited amounts of movement, of a tubular sleeve which is integral with the stage and the axis of which is perpendicular to the plane of the stage and of the base and the inside diameter of which is greater than the diameter to be measured, and of a tracer which is associated with a movement measuring means and which is carried by the tubular sleeve and has a rod which is movable in a radial direction of the tubular sleeve and the end of which projects into the bore of the tubular sleeve under the action of a spring, (c) the arm of the thrust assembly exerting a radially-directed thrust on the outer surface of the tubular sleeve in a zone diametrically opposite the tracer, when the device is placed in the active measuring position, the tubular sleeve surrounding the cylindrical element to be measured and the plane annular base of the supporting structure coming to rest on the plate.

BRIEF DESCRIPTION OF THE DRAWINGS

In order that the invention may be more clearly understood, an embodiment of the measuring device according to the invention, used for measuring the outside diameter of bushes guiding the instrumentation of a pressurized-water nuclear reactor, will now be described by way of example, with reference to the accompanying drawings.

FIG. 1 is an elevation view of the device in position on the lower core plate of a nuclear reactor.

FIG. 2 is a section view at line A—A of FIG. 1.

DESCRIPTION OF PREFERRED EMBODIMENT

Figure 1A:
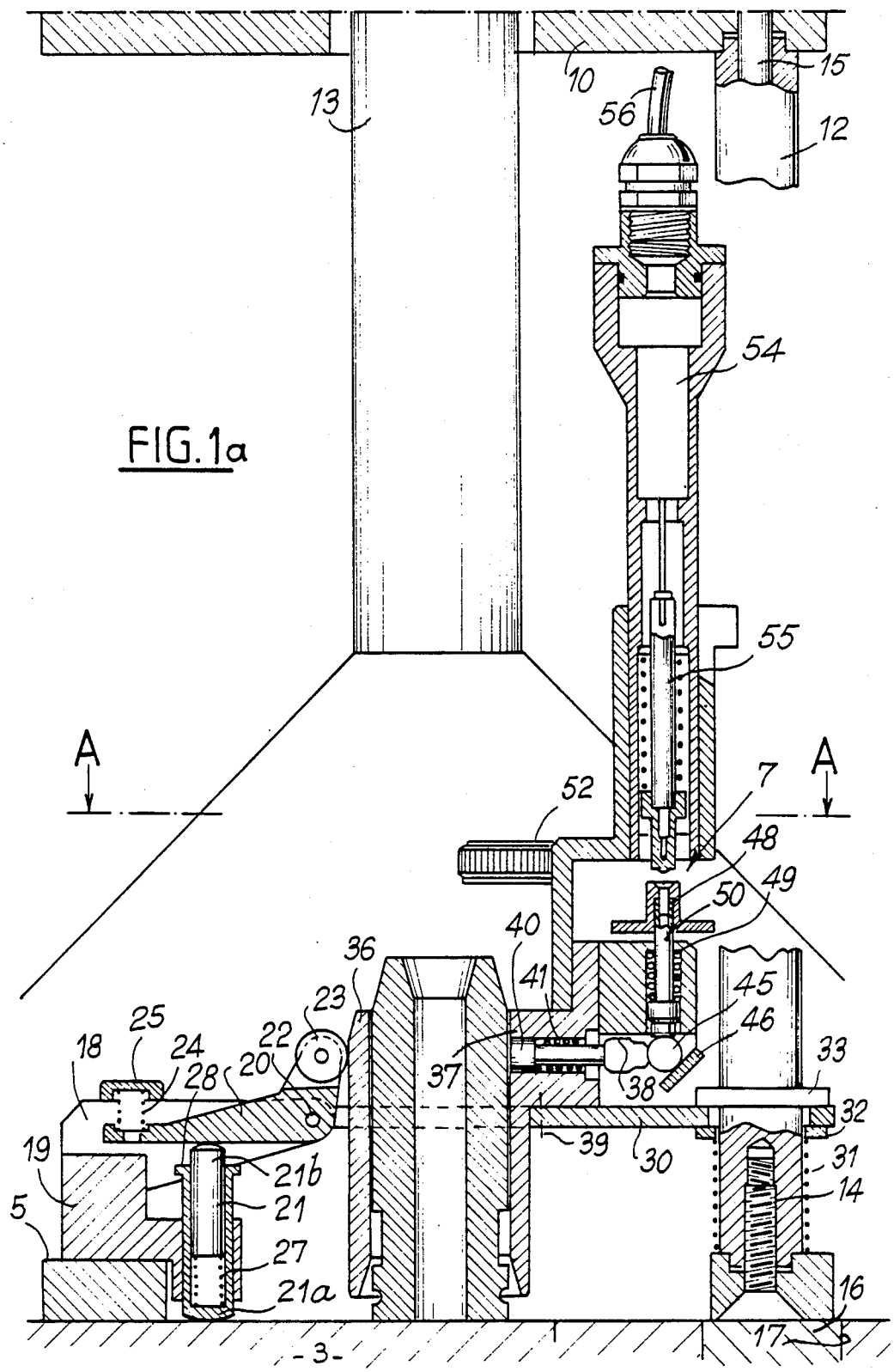
FIG. 1a is a sectional view of the lower part of the device on a larger scale.

FIGS. 1 and 1a show the lower part of the pole 1 of great length, making it possible to install a measuring apparatus, designated as a whole by the reference 2, on the lower core plate 3 of a pressurized-water nuclear reactor in the region of a guide bush 4 allowing a glove finger to pass throguh towards a fuel assembly.

In the drawings, the device has been shown in the operating position on the lower core plate 3, the reactor being shut down, the core assemblies being removed and the pool and reactor vessel being filled with water.

The handling pole 1, whose upper part (not shown) is located above the reactor pool and which is of a length greater than ten meters, makes it possible to lower the measuring apparatus 2 to the level of the lower core plate and move it along, for example using the reactor loading machine to carry out the handling operation.

The measuring apparatus 2 comprises a supporting structure 5 connected to the lower part of the pole 1 by means of a suspension device 6 and a measuring assembly 7 carried by the supporting structure 5.

The suspension device 6 comprises an upper plate 8 for connection to the pole 1, a middle plate 10 for connection to the supporting structure 5, three suspension arms 9 connecting the plates 8 and 10, and three columns 12 connecting the intermediate plate 10 to the plane annular base 5 forming the supporting structure of the measuring apparatus.

Furthermore, the intermediate plate 10 carries, in its central part, a television camera 13 making it possible to display the measuring zone.

The annular base 5 is fastened by means of screws 14 to the lower end of the suspension columns 12 which are themselves fastened, in their upper part, to the intermediate plate 10 by means of screws 15.

The annular base 5 is integral with two positioning studs, such as 16, projecting downwards and of a shape corresponding to the shape of the water passage orifices 17 extending through the lower core plate 3.

The annular base 5 also carries a thrust assembly 18 consisting of a support 19, a thrust arm 20 and an actuating finger 21.

The thrust arm 20 is mounted in an articulated manner on the support 19 about a horizontal pivot pin 22 and, at one of its ends which is bent, carries a bearing roller 23 mounted so as to be rotatable about a horizontal pivot pin. The other end of the arm 20 bears by menas of a spring 24 on a board 25 fastened to the support 19.

The finger 21 comprises an outer bush 21a and a pusher 21b mounted slideably in the bush 21a. A spring 27 is interposed between the bush 21a and the pusher 21b. The bush 21a is engaged and fitted slideably in an orifice passing through the support 19 and has an upper retaining edge 28 which allows the bush 21a to come to rest on the support 19 when the measuring apparatus 2 is lifted above the plate 3 by means of the pole 1. In this position of rest, the finger 21 then projects below the lower surface of the base 5 intended to come into contact with the upper surface of the lower core plate 3.

FIG. 1 shows the device in the operating position on the lower core plate 3, and in this operating position the finger 21 is up against the thrust arm 20 and is brought up against the latter during the installation of the measuring apparatus 2 on the lower core plate 3.

The finger 21 allows the arm 20 to tilt about the pivot pin 22, so as to move its bearing roller 23 to the right (in FIG. 1).

As can be seen in FIGS. 1a and 2, the measuring assembly 7 has a plane stage 30 mounted on the base 5, so as to be paralell to its plane faces, by means of springs 31 fitted round the lower part of the columns 12 and interposed between the upper surface of the base 5 and a washer 32 bearing under the lower face of the stage 30. The upper face of the stage 30 abuts against a stop element 33 of the column 12. In line with each of the columns 12, the stage 30 has a circular orifice 35 of a diameter substantially greater than the diameter of the column 12. The stage 30 can thus move parallel to the plane of the faces of the base 5 in all directions, either in a translational movement or in a rotational movement, by an amount determined by the play between the orifice 35 in the stage and the corresponding column 12.

Furthermore, the stage can be inclined about horizontal axes, in order to make it easier to install the measuring apparatus. The stage 30 has a V-shaped orifice which can be seen in FIG. 2 and which communicates with a circular central orifice, into which is introduced a tubular sleeve 36 arranged with its axis perpendicular to the stage 30.

The sleeve 36 is integral with a support 37, in which is mounted a measuring tracer with a movable rod 38, with which a movement measuring means, to be described later, is associated.

The tubular sleeve 36 has an inside diameter slightly greater than the maximum outside diameter allowed to the various guide bushes 4, on which the measurement is made.

The support 37 and consequently the tubular sleeve 36 are fastened rigidly to the stage 30 by means of screws 39.

In its position shown in FIG. 1, the thrust arm 20 bears by means of its roller 23 on the outer surface of the tubular sleeve 36, in a zone substantially diametrically opposite the position of the tracer 38.

The movable rod 40 of the tracer 38 is pushed towards the inside of the sleeve 36 by a spring 41, in such a way that the end of this rod 40 projects slightly inside the sleeve in its position of rest.

In the operating position demonstrated in FIG. 1, the tubular sleeve 36 is slipped onto the outer surface of the guide bush 4, on which the diameter measurement is made, and the end of the rod 40 is in contact with the outer surface of the bush 4.

The inner surface of the tubular sleeve 36 is machined to form two slightly projecting fixed stops arranged at 120 relative to the rod of the tracer 40 round the axis of the sleeve 36. In this way, when the thrust arm 20 bears by means of its roller 23 on the bush 36, the entire measuring assembly movable relative to the base 5 moves up to the moment when the fixed stops come into contact with the bush 4. At this moment, the position of the rod 40 of the tracer 38, which is up against the guide bush 4 at a point opposite the fixed stops, depends only on the outside diameter of the bush 4 or on the difference between this diameter and one or more reference values.

The position of the rod 40 must therefore be determined accurately, and, to achieve this, the end of this rod opposite the end in contact with the bush 4 comes up against a ball 45 which is itself in contact with a sloping surface 46 integral with the support 37. This assembly makes it possible to transfer, at an angle of 90° and with a ratio of 1, the movements of the rod 40 which are thus transmitted to a vertical rod 50 mounted in the support 37 and returned by a spring 49. The rod 50, in its upper part, is integral with an actuating plate 48, of which the movements of position representing the movements or position of the rod 40 of the tracer can be measured in two different ways.

A rocker-type comparator with a dial 52 comprises a rod 53 located just above the plate 48 and a dial located in the viewing field of the camera 13. The movements or the position of the rod 40 can thus be read directly.

An electronic movement sensor 54 is also arranged above the plate 48, with its rod 55 vertical and in the extension of the rod 50. The electronic sensor 54 is connected, by means of a cable 56, to an electronic processing box associated with a display screen making it possible to read directly the numerical values representing the position of the sensor.

The mode of operation of the device will now be described in relation to the measurement of the diameter of a guide bush fastened to the lower core plate of a pressurized-water nuclear reactor, this plate being under a head of water exceeding 10 meters in the vessel of the shutdown reactor.

Before the actual measuring operations, calibration is carried out using a calibrating plate having four orifices identical to the water passage orifices in the lower core plate, and two guide bushes which are perpendicular to the plate and the respective diameters of which are the minimum diameter and the maximum diameter of the guide bushes of the lower core plate, on which the measurement is made. These diameters are 31.50 and 32.00 mm, respectively. The calibrating plate also has a hole tapped in its central part, making it possible to fasten it by screwing to the end of the pole 1, in order to lower it to the bottom of the reactor pool. At the bottom of the pool, the measuring device is placed in position on the bush of minimum diameter and on the bush of maximum diameter of the calibrating plate. The corresponding values are recorded by means of the processing and display box, thus allowing direct diameter calibration under the precise operating conditions of the measuring device.

To put it into operation, the measuring apparatus is lowered to the bottom of the pool by means of the handling pole 1, the upper end of which is fastened to the reactor loading machine. The apparatus is first brought into a position located 100 mm above the lower core plate 3.

The operator then searches for the best possible centering by means of the video camera 13, the upper part of the guide bush 4 appearing in the center of the bore in the sleeve 36.

The device then continues to be lowered, its projecting guide and centering studs 16 penetrating into the corresponding water passage orifices 17 in the lower core plate 3. The supporting structure of the device and its base 5 in particular are then centered approximately relative to the bush 4.

The sleeve 36 of the movable measuring assembly of the device is then matched up with the upper part of the bush 4. To make engagement easier, the lower part of the inner surface of the sleeve 36 is widened downwards and interacts with the upper frusto-conical part of the bush 4. During the engagement and fitting of the sleeve 36 round the bush 4, the movable measuring assembly can be inclined in all directions at a small angle of deflection and can move in all the directions of the plane parallel to the plane bearing face of the base 5 which comes into contact and merges with the upper plane face of the lower core plate 3.

Before it comes into contact in this way, when, during lowering, the contact face of the base 5 arrives at a distance of 5 mm from the lower core plate, the finger 21 comes into contact with the lower core plate 3 by means of its bush 21a. When the measuring device continues to be lowered, the finger 21 moves in the vertical direction, comes into contact with the arm 20 by means of its pusher 21b and causes the arm 20 to tilt in such a way that its roller 23 moves to the right (in FIG. 1). The bearing roller 23 pushes back the sleeve 36 and the movable measuring assembly, up to the moment when the fixed stops inside the sleeve 36 come into contact with the outer surface of the guide bush 4. At this moment, the position of the rod 40 of the tracer 38 represents the diameter of bush. This position is recorded by means of the mechanical sensor 52 and the electronic sensor 54, and the diameter value in millimeters can be displayed directly by means of the processing box and its display screen.

For this purpose, the electronic sensor 54 is supplied with measuring current via the processing box which makes it possible to process the signals feeding the sensor 54 by means of an oscillator/demodulator module. The signals transmitted in return by the sensor 54, which is of the LVDT type (linear-displacement differential transformer), are received by the processing box which converts the electrical information of the signals into, for example, digital information representing the diameter of the guide bush or its variation in relation to a specific diameter value. The processing box also has an output making it possible to provide permanently a signal in analog form which represents the diameter or its variations and which can be utilized, for example, on a chart recorder.

The information in digital form can be used not only for displaying the diameter value but also for processing it in a computer.

A value representing the diameter of the guide bush can be read directly by the operator on the dial 52 by means of the video camera 13.

The arrangement at 120° of the fixed stops and of the rod 40 of the tracer 38 makes it possible to carry out installation and measurement under very reliable conditions.

Thus, by means of the measuring device according to the invention, it becomes possible to achieve an accuracy greater than 0.01 mm and a fidelity better than 0.001 mm, under the conditions of use which have been described.

During the measurements, to prevent any disturbing influence of even a slight stress transmitted to the measuring device by means of the handling pole 1, the pole continues to be lowered after the measuring device rests on the lower core plate 3. This makes it possible to release the device completely, the connection between the pole 1 and the suspension device 6 of the measuring apparatus being of the shackle type.

It will be seen from the foregoing description that the measuring device is perfectly safe, completely reliable and easy to use. The elements are put in position on the lower core plate and round the guide bush automatically, from the moment when pre-positioning has been carried out by means of the video camera associated with the measuring device. The diameter of the guide bushes or the variation in this diameter can be read or recorded directly by processing, display and recording means which are completely conventional.

The sleeve and the bush can be brought into contact with one another, before the measurement, by a means different from a set of two fixed stops located opposite the tracer rod.

The base of the supporting structure coming to rest on the lower core plate can be connected to the handling pole by means of a device different from the suspension device with a tie and columns which has been described. Likewise, the movable measuring assembly can be mounted on this base in a different way from that described, which used the suspension columns and bearing springs allowing a flexible mounting. The movement sensors can be of a type different from those described, and it is possible to use a single type of sensor just as well as several sensors in parallel. It would also be possible to use a sensor which makes it possible to measure directly the movements of the rod of the measuring tracer, without transfer at an angle.

Finally, the device according to the invention can be used for operations other than the checking of the guide bushes of the lower core plate of a pressurized-water nuclear reactor. It can be used whenever it is necessary to measure very accurately and remotely the diameter of a cylindrical element projecting relative to a fixed plate perforated with orifices in the vicinity of the cylindrical element.

What is claimed is:

1. Device for the remote measurement of the outside diameter of a cylindrical element (4) projecting relative to the surface of a plate (3) perforated with at least two orifices (17) in the vicinity of the cylindrical element (4), comprising a handling pole (1) and a measuring apparatus (2) connected to the end of the pole, wherein the measuring apparatus comprises:

a supporting structure (5) consisting of a plane annular base provided with at least two projecting guide and centering parts (16) intended to interact with the orifices (17) in the plate (3) and a thrust assembly (18) consisting of an arm (20) mounted in an articulated manner on the base (5) and having a bearing means (23) at its end, and of an actuating finger (21) mounted so as to project relative to a face of the base (5) intended to come into contact with the plate (3), in order to actuate the thrust arm (20) when they come into contact, and a measuring assembly carried by the supporting structure and consisting of a stage (30) mounted on the annular base (5) so as to be movable in all the directions of the plane of the base (5) and with limited amounts of movement, of a tubular sleeve (36) which is integral with the stage (30) and the axis of which is perpendicular to the plane of the stage (30) and of the base (5) and the inside diameter of which is greater than the diameter to be measured, and of a tracer (38) which is associated with a movement measuring means (52, 54) and which is carried by the tubular sleeve (36) and has a rod (40) which is movable in a radial direction of the tubular sleeve (36) and the end of which projects into a bore of the tubular sleeve (36) under the action of a spring (41), the arm (20) of the thrust assembly exerting a radially-directed thrust on the outer surface of the tubular sleeve (36) in a zone diametrically opposite the tracer (38), the tubular sleeve (36) surrounding the cylindrical element to be measured, and the plane face (5) of the supporting structure coming to rest on the plate (3) when the device is placed in the active measuring position.

2. Measuring device according to claim 1, wherein the supporting structure formed by the base (5) is connected to the handling pole (1) by means of a suspension device (6) comprising at least one suspension plate (8, 10) and a set of columns (12).

3. Measuring device according to claim 2, wherein the columns (12), in their lower part, are fastened to the base (5), and in that the stage (30) of the movable measuring assembly, having orifices of a diameter greater than the diameter of the columns, is interposed, in line with each column (12) passing through it with play via an orifice, between a spring (31) bearing on the base (5) and a stop (33) integral with the column (12).

4. Measuring device according to claim 2, wherein the suspension device (6) is connected to the end of the handling pole (1) by means of a connection of the shackle type.

5. Measuring device according to claim 1, wherein the sleeve (36) has, on its inner surface, two fixed stops arranged in angular positions of 120 round the axis of the sleeve in relation to the movable rod (40) of the tracer (38).

6. Measuring device according to claim 1, wherein the rod (40) of the tracer (38) is connected to the movement measuring means (52, 54) by means of an angular-transfer assembly (46, 50, 48).

7. Measuring device according to claim 1, wherein the means measuring the movement of the rod (40) of the tracer (38) consists of a mechanical sensor with a direct read-off (52) and of an electronic sensor (54) with an analog or digital output supplying the movement measurement in parallel.

8. Measuring device according to claim 2, wherein the suspension device (6) carries a video camera (13) making it possible to display the measuring zone, for the installation of the device and for the direct reading of the measurement on the movement measuring means (52).

9. Measuring device according to claim 1, wherein the bearing means of the thrust arm (20) consists of a roller (23).

10. Use of a measuring device according to any one of claims 1 to 9 for measuring the outside diameter of a guide bush fastened to the lower core plate of a pressurized-water nuclear reactor, the measurement being made during a shutdown of the nuclear reactor and the pool and vessel of this reactor being filled with water and the core assemblies removed.

* * * * *